(12) United States Patent
Cowherd

(10) Patent No.: US 10,624,381 B2
(45) Date of Patent: Apr. 21, 2020

(54) CHANGING POSITIONAL ORIENTATIONS OF FOOD PRODUCTS ON CONVEYORS DURING ROASTING AND OTHER OPERATIONS

(71) Applicant: Unitherm Food Systems, LLC, Bristow, OK (US)

(72) Inventor: Adam Thomas Cowherd, Tulsa, OK (US)

(73) Assignee: UNITHERM FOOD SYSTEMS, LLC, Bristow, OK (US)

(*) Notice: Subject to any disclaimer, the term of this patent is extended or adjusted under 35 U.S.C. 154(b) by 103 days.

(21) Appl. No.: 15/618,526

(22) Filed: Jun. 9, 2017

(65) Prior Publication Data

US 2018/0352846 A1    Dec. 13, 2018

(51) Int. Cl.
| | |
|---|---|
| *A23L 5/10* | (2016.01) |
| *A23N 12/12* | (2006.01) |
| *A23N 12/08* | (2006.01) |
| *A47J 37/04* | (2006.01) |
| *A23L 19/00* | (2016.01) |

(52) U.S. Cl.
CPC ............. *A23N 12/125* (2013.01); *A23L 5/15* (2016.08); *A23L 19/03* (2016.08); *A23N 12/08* (2013.01); *A47J 37/045* (2013.01); *A23V 2002/00* (2013.01)

(58) Field of Classification Search
CPC ....... A23N 12/125; A23N 12/08; A23L 19/03; A23L 5/15; A47J 37/045; A23V 2002/00
See application file for complete search history.

(56) References Cited

U.S. PATENT DOCUMENTS

| | | | | |
|---|---|---|---|---|
| 1,937,416 | A * | 11/1933 | Smith | A23L 27/10 126/41 A |
| 4,873,107 | A * | 10/1989 | Archer | A21B 1/245 426/520 |
| 5,370,898 | A * | 12/1994 | Zussman | A23L 5/19 426/523 |
| 5,832,812 | A * | 11/1998 | Wolfe | A21B 1/245 99/443 C |
| 5,858,431 | A * | 1/1999 | Wiedersatz | A21D 8/06 426/242 |
| 6,244,168 | B1 * | 6/2001 | van de Vorst | A21B 1/48 99/443 C |
| 6,817,283 | B2 * | 11/2004 | Jones | A21B 1/245 99/386 |
| 6,933,473 | B2 * | 8/2005 | Henke | A21B 1/245 219/388 |
| 7,721,463 | B2 * | 5/2010 | Leon | A47J 37/044 34/321 |

(Continued)

*Primary Examiner* — Steven N Leff
(74) *Attorney, Agent, or Firm* — Dennis D. Brown; Brown Patent Law, P.L.L.C.

(57) ABSTRACT

An apparatus, system and method for changing the positional orientations of peppers or other individual food product items or pieces on an open conveyor belt as the product items or pieces are being continuously conveyed through an apparatus for flame roasting, cooking, searing or otherwise treating the product. The open conveyor belt carries the peppers or other products over one or more air knives which are installed in the apparatus beneath the open conveyor belt for rolling, rotating, and/or momentarily lifting the product items or pieces.

16 Claims, 3 Drawing Sheets

(56) References Cited

U.S. PATENT DOCUMENTS

| | | | |
|---|---|---|---|
| 7,765,918 B2* | 8/2010 | Garniss | A21B 1/48 |
| | | | 126/20 |
| 7,993,693 B2* | 8/2011 | Bows | A23P 30/32 |
| | | | 426/233 |
| 8,087,407 B2* | 1/2012 | Wiker | A21B 1/40 |
| | | | 126/19 R |
| 8,304,695 B2* | 11/2012 | Bonuso | F24C 15/325 |
| | | | 126/21 A |
| 8,728,555 B1* | 5/2014 | Howard | A23L 5/13 |
| | | | 426/383 |
| 8,839,714 B2* | 9/2014 | Schjerven, Sr. | A21B 1/245 |
| | | | 126/21 A |
| 9,491,957 B2* | 11/2016 | Ovadia | A23L 13/06 |
| 2003/0217645 A1* | 11/2003 | Jones | A21B 1/245 |
| | | | 99/386 |
| 2004/0187709 A1* | 9/2004 | Murthy | A23N 12/083 |
| | | | 99/483 |
| 2013/0302490 A1* | 11/2013 | James | A23L 3/3445 |
| | | | 426/443 |

* cited by examiner

CHANGING POSITIONAL ORIENTATIONS OF FOOD PRODUCTS ON CONVEYORS DURING ROASTING AND OTHER OPERATIONS

FIELD OF THE INVENTION

The present invention relates to apparatuses, systems and methods for changing the positional orientation of peppers, onions, garlic, potatoes, tomatoes, other fruits and vegetables, pizza toppings, diced onions, mushrooms, chicken parts, bacon bits, meat balls, other proteins, or other individual food product items or product pieces while conveying such food products through a flame roasting system or through other systems for cooking, roasting, searing, grilling, or otherwise treating the food products.

BACKGROUND OF THE INVENTION

When flame roasting peppers or similar food products, it is necessary, or at least greatly preferred, that all of the surrounding surfaces of the product be directly exposed to the burner flame. The flame chars the outer skin of the product, which is then removed using a washing process. In industrial processes used for flame roasting peppers and other products, the product is typically exposed to a direct flame while being tumbled in a rotating drum or while being carried on a conveyor belt.

When carried on a conveyor belt, the product remains in a static (stationary) position on the belt unless acted upon, for example, by some mechanical or gravitational means which causes the product to rotate or otherwise move to a different position. The rotation or movement of the product on the belt is desirable to ensure that all surfaces of the product are exposed to the flame. In addition, it is desirable that the rotation or movement of the product be controlled and timed in a way so as to ensure that all surfaces of the product receive adequate direct exposure to the flame but no portion of the product is overexposed. Such overexposure decreases both the yield and the quality of the roasted product.

Consequently, a continuing need exists for improved, economical, efficient, low maintenance systems which are highly effective for rotating or otherwise changing the positional orientation of peppers or other individual food product items or pieces while conveying the products through flame roasting systems and other processing systems so that the entire outer surface of the product is subjected to uniform treatment. Additionally, however, such systems for rotating or otherwise moving peppers or other products on a product conveyor belt should also operate in a manner which ensures that the products are gently handled and are not subjected to excessive impact forces. Subjecting peppers and other products to excessive impact forces can physically break, mark, or otherwise degrade the products. Damaging impact forces can be caused, for example, by (a) impacting the products with physical mechanisms used for moving the products, (b) causing the products to collide with physical structures positioned for product displacement, (c) causing the products to collide with each other, or (d) dropping the products from one elevation to another.

U.S. Pat. No. 6,132,748 discloses an apparatus for UV light disinfection of fruits and vegetables wherein the conveyor which carries the products through the apparatus can be formed of a continuous series of lateral rollers which are caused to rotate as they carry the product through the apparatus so that all exterior surfaces of the product are exposed to the disinfecting illumination of the UV light. Unfortunately, however, roller conveyor systems of the type used in the disinfecting apparatus of U.S. Pat. No. 6,132,748 have significant shortcomings and disadvantages. In addition to their high, cost, these systems can damage the product in ways which adversely affect the product yield, integrity, shape, and color.

U.S. Pat. No. 6,099,882 discloses an apparatus for roasting skinned products such as peppers, onions, garlic, and potatoes wherein the conveyor system which carries the products through the apparatus comprises (a) a conveyor formed of a continuous series of lateral rollers having sprockets attached to the ends thereof, (b) a drive chain which continuously drives the conveyor through the apparatus in a clockwise direction, and (c) a spinner chain which is driven in a counterclockwise direction to engage the sprockets of the rollers and thereby cause the rollers to rotate as they carry the product through the apparatus.

Unfortunately, conveyor systems of the type used in the roasting apparatus of U.S. Pat. No. 6,099,882 also have significant shortcomings and disadvantages. In addition to having the same general deficiencies as the system described in U.S. Pat. No. 6,132,748, conveyor systems of the type described in U.S. Pat. No. 6,099,882 have a limited range of control and the mechanical movement of these systems in a heated environment is prone to failure.

U.S. Pat. No. 6,060,104 discloses a grilling apparatus for hamburgers and chicken breasts in which the patties or chicken breasts are turned over (flipped) one time as they pass through the apparatus by dropping the patties or chicken breasts from a first conveyor at a higher elevation to a second conveyor at a lower elevation. Unfortunately, conveyor systems of the type used in the grilling apparatus of U.S. Pat. No. 6,060,104 also have significant shortcomings and disadvantages. For example, the individual product items or pieces must be of substantially the same weight and shape in order to flip properly. In many instances, the product sticks to the belt and does not flip at all. In addition, these systems have a limited range of control and the flip or fall which changes the orientation of the product can cause even greater product damage and loss of yield.

Another type of system used in the art for rotating or otherwise changing the positional orientation of peppers or other food products on a conveyor as the products are carried through a roasting apparatus or other treatment system consists of a thumper that mechanically lifts and drops the conveyor belt in a manner which causes the product to bounce. Unfortunately, these systems cause significant machine and belt wear and are often too aggressive, often resulting in substantial product breakage.

SUMMARY OF THE INVENTION

The present invention provides an improved method and an improved apparatus for changing the positional orientation of peppers or other individual food product items or food product pieces on a conveyor belt while conducting the products through a continuous roasting system or other continuous treatment operation. The inventive method and apparatus satisfy the needs and alleviate the problems discussed above and also provide numerous additional benefits and advantages. Such benefits and advantages include, but are not limited to: providing more uniform and greater exposure of the product to the roasting flames or other heating source; preventing or reducing product damage; providing the ability to easily adjust the inventive method and apparatus to adapt to different products over a wide range of weights, sizes and shapes; and preventing mechanical wear on the conveyor belt.

In one aspect, there is provided a method of treating individual food product items or individual food product pieces comprising the steps of: (a) continuously carrying the individual food product items or individual food product pieces through a housing of a treatment apparatus on a carrying run of an open conveyor belt wherein each of the individual food product items or individual food product pieces rests in a positional orientation on the carrying run of the open conveyor belt and the carrying run of the open conveyor belt carries the individual food product items or individual food product pieces over one or more air knives positioned in the housing beneath the carrying run of the open conveyor; (b) discharging air from the one or more air knives through the open conveyor belt such that the air discharged from the one or more air knives blows against and changes the individual positional orientations of the individual food product items or individual food product pieces on the carrying run of the open conveyor; and (c) treating the individual food product items or individual food product pieces by flame roasting, cooking, searing, or grilling; the individual food product items or individual food product pieces in the housing of the treating apparatus as the individual food product items or individual food product pieces are carried by the carrying run of the open conveyor belt.

In another aspect, there is provided a method of flame roasting peppers comprising the steps of; (a) continuously carrying the peppers through a roasting apparatus on a carrying run of an open conveyor belt wherein the carrying run of the open conveyor belt carries the peppers over one or more air knives positioned in the roasting apparatus beneath the carrying run of the open conveyor; (b) discharging air from the one or more air knives upwardly through the open conveyor belt such that the air discharged from the one or more air knives blows against the peppers to (i) momentarily lift the peppers upwardly at least 1 mm off of the carrying run of the open conveyor belt and/or (ii) roll or rotate the peppers at least 20° in at least one direction on the carrying run of the open conveyor belt; and (c) contacting the peppers with a flame in the roasting apparatus before step (b), during step (b), after step (b), or a combination thereof.

In another aspect, there is provided an apparatus for flame roasting peppers or other individual food product items or individual food product pieces, the apparatus comprising: (a) a housing; (b) an open conveyor belt having a carrying am which extends longitudinally in the housing in a direction of travel for continuously carrying the peppers or other individual food product items or individual food product pieces through the housing; (c) one or more burners in the housing, each of the one or more burners being positioned and oriented for contacting the peppers or other individual food product items or individual food product pieces with a flame as the peppers or other individual food product items or individual food product pieces are carried on the carrying run of the open conveyor belt through the housing; and (d) one or more air knives which are positioned in the housing beneath the carrying run of the open conveyor belt and are oriented to discharge air upwardly through the carrying run of the open conveyor belt into contact with the peppers or other individual food product items or individual food product pieces such that the one or more air knives operate to (i) roll or rotate the peppers or other individual food product items or individual food product pieces on the carrying run of the open conveyor belt, (ii) momentarily lift the peppers or other individual food product items or individual food product pieces off of the carrying run of the open conveyor belt, or (iii) otherwise change a positional orientation of the peppers or other individual food product items or individual food product pieces on the carrying run of the open conveyor belt.

Further aspects, features, and advantages of the present invention will be apparent to those in the art upon examining the accompanying drawings and upon reading the following Detailed Description of the Preferred Embodiments.

DETAILED DESCRIPTION OF THE PREFERRED EMBODIMENTS

Figure 1:
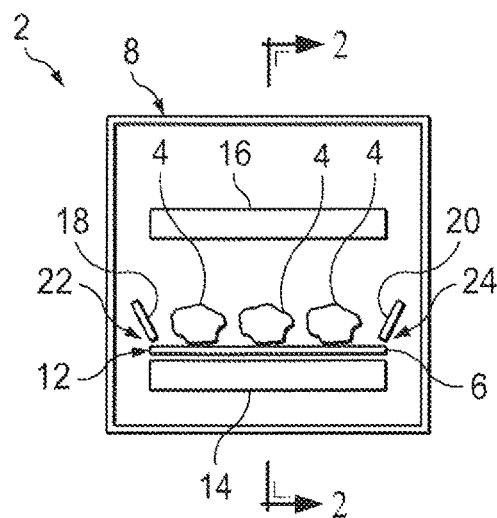
FIG. 1 is an elevational end view of a linear embodiment 2 of the inventive treatment system.
Figure 2:
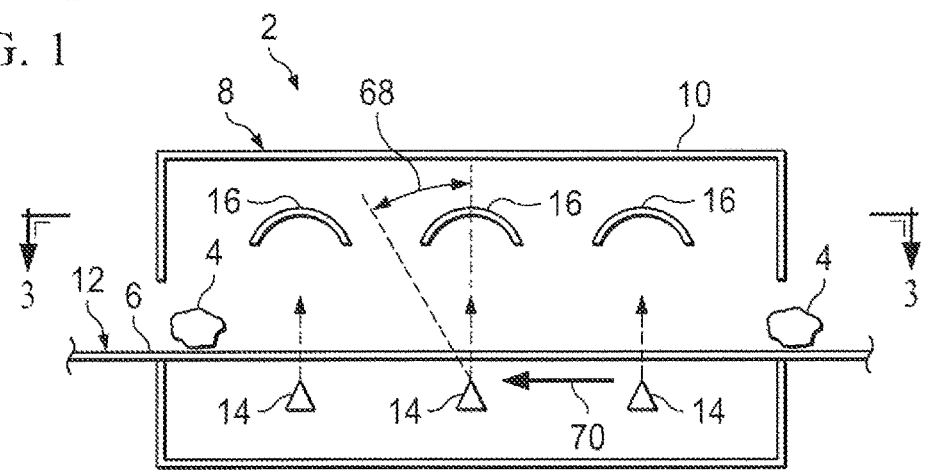
FIG. 2 is an elevational cutaway side view of the inventive treatment system 2 as seen from perspective 2-2 shown in FIG. 1.
Figure 3:
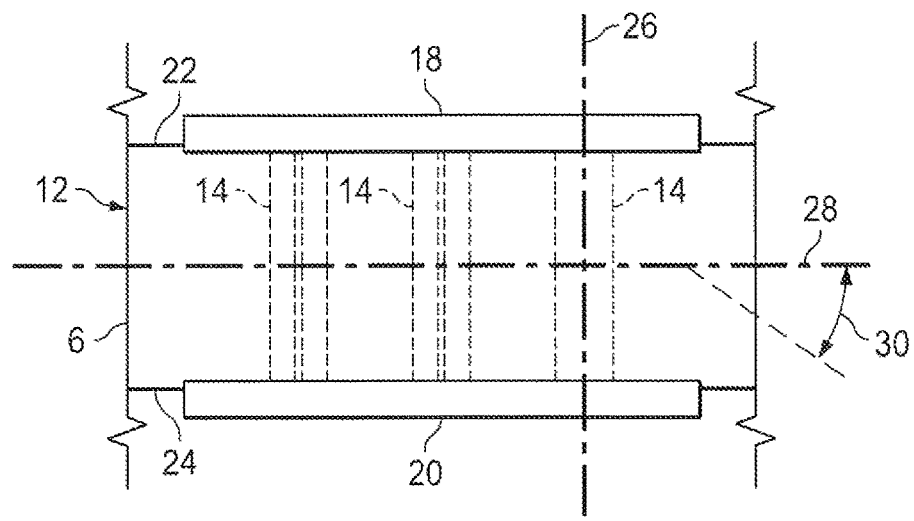
FIG. 3 is a cutaway plan view of the inventive treatment system 2 as seen from perspective 3-3 shown in FIG. 2.

An embodiment 2 of the inventive system for changing the positional orientation of individual food product items 4 (e.g., peppers onions, garlic bulbs, potatoes, etc.) or individual food product pieces on an open conveyor belt 6 while conveying the product items or pieces 4 through a roasting, cooking, searing, grilling, or other treatment apparatus 8 is illustrated in FIGS. 1-3. The inventive treatment system 2 preferably comprises: a housing 10 of the treatment apparatus 8 through which the product items or pieces 4 are carried on a horizontal carrying run 12 of the open conveyor belt 6; one or more air knives 14 positioned in the housing 10 below the carrying run 12 of the open conveyor 6; deflectors 16 positioned above the carrying run 12 of the conveyor 6 and preferably directly above some or all of the air knives 14; and a pair of retaining side rails 18 and 20 which extend longitudinally in the housing 10 along each lateral side 22 and 24 of the carrying run 12 of the conveyor 6.

The open conveyor belt 6 is preferably a rod type belt comprising a continuous series of lateral rods having spaces provided between the rods which will allow air to flow though the belt 6. However, it will be understood that the open conveyor belt 6 can alternatively be a wire mesh belt or any other typed of open conveyor belt which can be formed with openings which are small enough to retain the individual product items or pieces 4 on the belt while still allowing the air discharged by the one or more air knives 14 to flow upwardly through the belt 6 with suffient force to lift, roll, rotate, or otherwise change the positional orientation of the individual product items or pieces 4 on the belt 6.

Air knives 14 suitable for use in the inventive apparatus and method are commercially available from numerous manufacturers. As is known in the art, an air knife typically comprises an elongate metal tube structure having (a) one or more inlet connections provided in one or both ends and/or in a side of the tube structure for receiving pressurized air and (b) a single elongate slit or a series of slits or nozzles for discharging a narrow, elongate, high velocity, high impact air stream along at least most of the length of tube structure.

In the linear embodiment of the inventive treatment system 2 depicted in FIGS. 1-3, some or all of the one or more air knives 14 will preferably be laterally positioned in the housing 10 below the carrying run 12 of the open conveyor 6 such that the longitudinal axis 26 of the air knife 14 is or is substantially (i.e., with in ±10° of) perpendicular to the longitudinal axis 2-8 of the carrying run 12.

Alternatively, some or all of the one or more air knives 14 used in the linear treatment system 2 can be diagonally positioned beneath the carrying run 12 of the conveyor 6. By way of example, in the case of a linear treatment system 2 as depicted in FIGS. 1-3, one or more of the air knives 14 used in the inventive system 2 can be diagonally positioned beneath the conveyor 6 for such purposes as: (a) moving the product items or pieces 4 linearly at different times rather than moving all of the pieces or items 4 perpendicularly at the same time or (b) restricting air along the length of the system to group the product items or pieces 4 on the one side of the conveyor 6 versus the other. The diagonal angle 30 of any of the one or more air knives 14 oriented in this manner, with respect to the longitudinal axis 28 of the conveyor 6, will preferably be in the range of from about 15° to about 45°.

Additionally, as another alternative, at least one or more air knives 14 can be operated to pulsate or otherwise discharge air intermittently. By way of example, the intermittent, discharge of air from one or more of the air knives 14 can be used to: (a) produce random agitation, (b) allow the product items or pieces 4 to fall back down to the conveyor 6 and then proceed forward, and/or (c) allow pressure to build in the air knife 14. As an example of one operating mode, the intermittent discharges from one of more of the air knives 14 can continuously cycle between an "on" stage of from about 1 to about 5 or 10 seconds in duration and an "off" stage of front about 1 to about 5 or 10 seconds. As an example of another intermittent operating mode, a momentary burst of air from an air knife 14 can be automatically triggered by the detection of an event or condition in accordance with a process recipe for the product.

The longitudal length of each lateral air knife 14 used in the inventive linear system 2 will preferably be such that the stream air supplied by the air knife 14 at the point of discharge from the air knife 14 will preferably extend across at least 75% of the lateral width of the conveyor 6. The air stream discharged by each lateral air knife 14 will more preferably be in the range of from about 90% to about 110% of the lateral width of the conveyor 6 and will most preferably be the same as or substantially the same as (i.e., within ±5% of) the lateral width of the conveyor 6.

Alternatively, it will be understood that one or more shorter lateral air knives 14 can be used in the inventive linear treatment system 2 in order to create areas of greater or lesser air flow through the belt as needed to reposition, group, or separate the particular product 4 in question in any manner desired.

Figure 4:
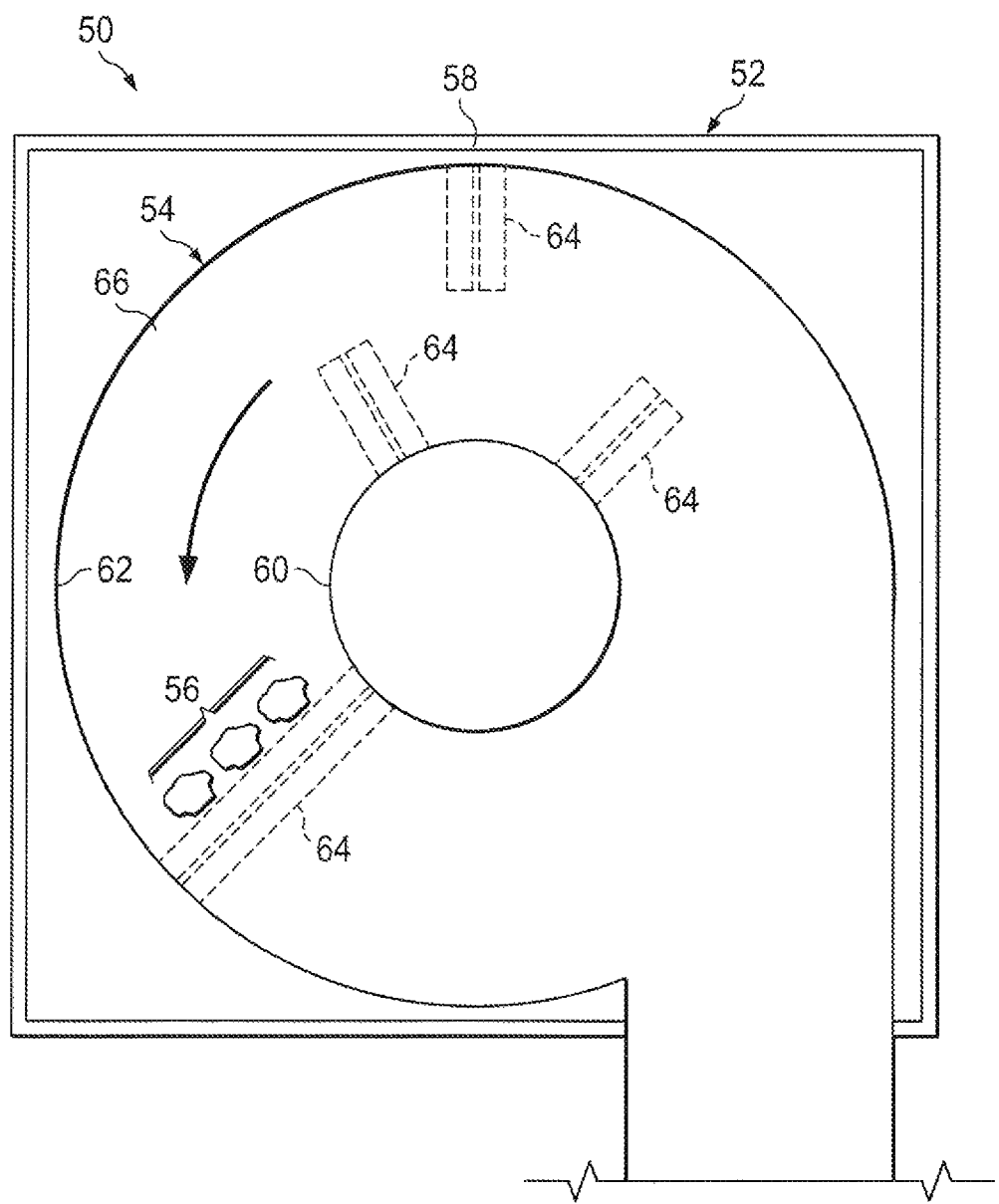
FIG. 4 is a cutaway plan view of a spiral embodiment 50 of the inventive treatment system.

In another embodiment 50 of the inventive treatment apparatus and method depicted in FIG. 4, the treatment system 52 can be a spiral oven or other system having an open conveyor belt 54 of a type which carries the food product 56 upwardly or downwardly in the housing 58 of the system 52 in a spiral pattern. Unless otherwise stated, the features and characteristics of the inventive spiral system 50 can generally be the same as those of the inventive linear system 2. However, in contrast to the inventive linear system 2, the spiral oven system 50 will typically be a convective cooking system wherein the flow velocity of the cooking medium or other treatment medium circulating in the spiral system 50 will be less on the inside portion 60 of the spiral than on the outside portion 62. Also, for many types of spiral belts 54 the collapse of the belt 54 when traveling in a spiral pattern can cause the air flow passages through the belt 54 to be smaller on the inside portion 60 of the spiral than on the outside portion 62. In addition, the spiral belt 54 will be inclined upwardly against the direction of travel of the belt 54 if the product 56 is being conveyed upwardly and will be inclined downwardly with the direction of travel if the product 56 is being conveyed downwardly.

Consequently, in order to compensate for the effects of the lower circulating air velocity on the inside portion 60 of the sprial belt 54 or for other factors, some of the one or more air knives 64 installed under the spiral carrying run 66 of the open conveyor belt 54 can be shortened lateral knives which extend only part way from the inside portion 60 of the spiral to the outside 62 or only part way from the outside portion 62 to the inside portion 60. The air discharge of these shortened lateral, air knives 64 will preferably not extend over more than one half of the lateral width of the spiral conveyor 54. In addition, in order to compensate for the collapse of the belt 54, the inside air knives 64 can be of a different velocity and/or a different number than the outside air knives 64.

Turning back to the inventive linear treatment system 2 depicted in FIGS. 1-3, some or all of the one or more air knives 14 beneath the carrying ran 12 of the open conveyor 6 are preferably installed in the housing 10 so that (a) the amount or velocity of the air flow through the air knife 14 can be adjusted, (b) the height of the air knife 14 (i.e., the closeness of the discharge of the air knife 14 to the bottom the the carrying run 12 of the conveyor 6) can be adjusted, and/or (c) the discharge of the air knife 14 can be perpendicular or substantially perpendicular to the carrying run 12 of the belt 6 or can be adjusted to any angle of discharge 68 of from 0° to 45° from vertical in the direction of travel 70 of the carrying run 12 of the conveyor 6.

In accordance with the inventive method, when roasting, grilling, cooking, searing, or otherwise treating individual food product items or pieces 4 such as peppers, onions, garlic bulbs, potatoes, tomatoes, meatballs, chicken parts, diced vegetables, or mushrooms, the amount or velocity of air flow discharge and/or the height of one or more of the air knives 14 can be adjusted and set such that the air knife 14 will momentarily lift the individual product items or pieces 4 off of the conveyor 6. The individual items or pieces will preferably be lifted upwardly by at least 1 mm but preferably not more than twice the height of the product. Lifting the individual product items or pieces in this manner can assist in changing the positional orientation of the items or pieces 4 on the conveyor 6 and can also allow the product 4 to be contacted by a flame or otherwise treated while in a momentarily suspended state wherein no surfaces of the product are in contact with the belt 6.

Alternatively, or in addition, when roasting, grilling, cooking, searing, or otherwise treating individual food product items or pieces 4 such as peppers, onions, garlic bulbs, potatoes, tomatoes, meatballs, chicken parts, diced vegetables, mushrooms, snack foods or jerky, the amount or velocity of air flow discharge, the angle of discharge, and/or the height of one or more of the air knives 14 can be adjusted and set such that the air discharged from one or a series of two or more adjacent ones of the one or more air knives 14 will change the individual positional orientations of the product items or pieces 4 by causing the individual items or pieces 4 to roll or rotate by at least 10° (more preferably at least 15°; at least 20°; at least 25°, or at least 30°) in at least one direction on the carrying run 12 of the open conveyor belt 6. It is also preferred for some products that the cumulative effect of all of the one or more air knives 14 used in the inventive treatment system 2, from the inlet of the housing 10 to the outlet thereof, will be to cause the individual product items or pieces 4 to roll and/rotate by a total amount of at least 45°, more preferably at least 60°, at least 70°, at least 80°, or at least 90°, in at least one direction on the carrying run 12 of the open conveyor 6.

If a non-perpendicular discharge angle 68 is used for any of the one or more air knives 14 for assisting in rolling, rotating, or otherwise changing the positional orientation of the individual product items or pieces 4 on the carrying run 12 of the conveyor 6, the discharge angle 68 will preferably be from about 5° to about 45° and will more preferably be from about 10° to about 15° from vertical in the direction of travel 70 of the carrying run 12 of the conveyor 6.

Also in accordance with the inventive method, when roasting, grilling, cooking, searing, or otherwise treating individual food product items or pieces 4 such as pizza toppings, meatballs, diced onions, mushrooms, bacon bits, diced vegetables, mushrooms, snack foods, or jerky, the amount or velocity of air flow discharge and/or the height of the one or more of the air knives 14 can be adjusted and set such that the air discharged from the air knives will operate to flip the product items or pieces 4 (i.e., turn the Items or pieces 4 over) on the carrying run 12 of the open conveyor belt 6.

When used in the inventive treatment system 2, each deflector 16 installed in the housing 10 will be positioned above the carrying run 12 of the conveyor 6 and will preferably also be positioned directly above the air discharge of a corresponding air knife 14. Each deflector 16 will preferably be spaced from about 10 to about 12 cm above the conveyor 6. In addition, each deflector 16 will preferably be of substantially the same length and orientation as the air knife 14 positioned below the deflector 16 and will preferably have a laterally curved, concave lower side 72 which faces the carrying run 12 of the conveyor belt 6. The deflectors 16 operate to block any product items or pieces 4 which are blown upwardly off of the conveyor 6 by the air knives 14. This can occur, for example, if the product items or pieces 4 in question are significantly underweight or oversized.

The conveyor side rails 18 and 20 used in the inventive treating apparatus 2 are preferably elongate stationary structures which are installed in the housing 10 of the treating apparatus 2 such that the side rails 18 and 20 extend longitudinally along the opposing left and right lateral sides 22 and 24 of the carrying run 12 of the conveyor belt 6. The left and right side rails 18 and 20 are preferably positioned above or at least partially above the left and right lateral side portions 22 and 24 of the conveyor belt 6. As they extend upwardly on the left and right lateral sides of the conveyor 6, the side rails 18 and 20 also preferably diverge outwardly at an angle which is preferably in the range of from about 15° to about 20° from vertical. The angled side rails 18 and 20 operate to (a) prevent individual product items or pieces 4 from rolling off of or being blown laterally off of the sides 22 and 24 of the conveyor belt 6 and (b) assist in rolling such product items or pieces 4 back toward the center portion of the belt 6.

Figure 5:
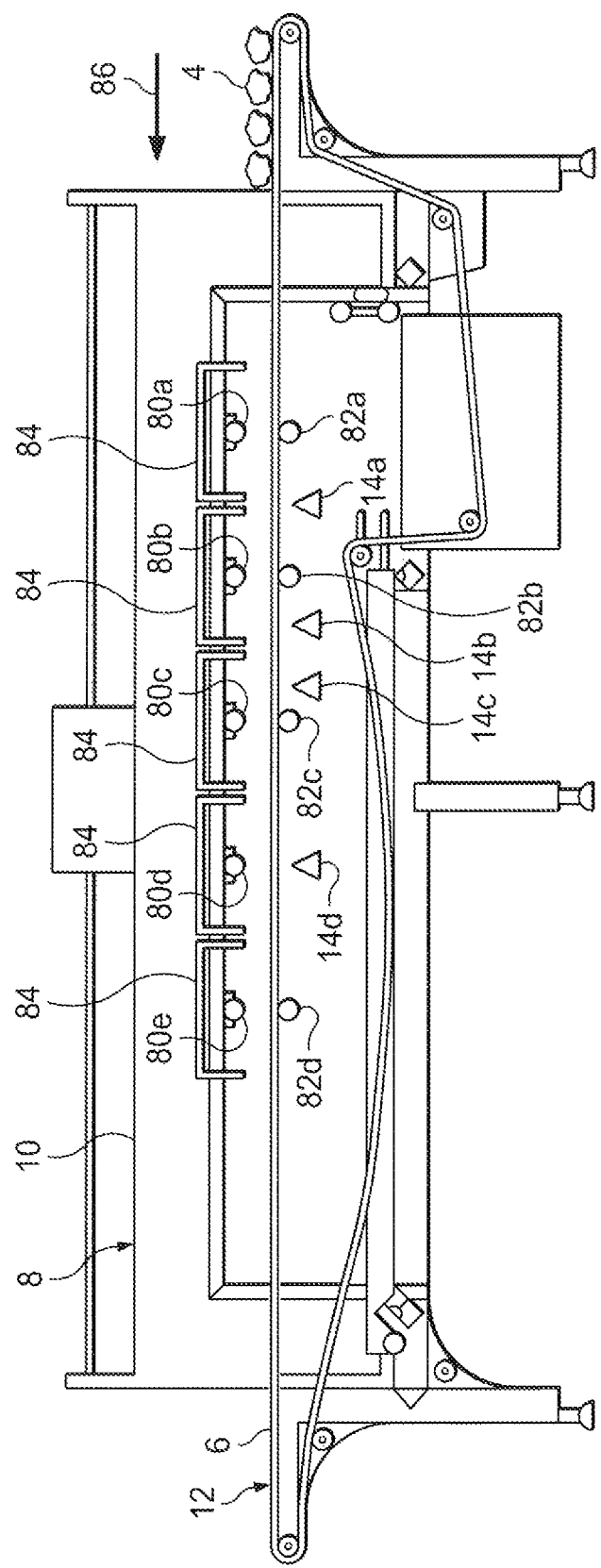
FIG. 5 is a cutaway elevational side view of one type of treatment apparatus 8 which can be used in the inventive treatment system 2.

An example of a treatment apparatus 8 which can be used in the inventive treatment system 2 for flame roasting peppers, onions, garlic bulbs, potatoes, tomatoes and other types of individual product items or individual product pieces 4 is illustrated in FIG. 5. The treatment apparatus 8 can also be used in the inventive system 2 for searing or cooking other types of products.

The treatment apparatus 8 illustrated in FIG. 5 comprises: one or more, preferably a series of, upper lateral burners 80a-80e (preferably linear blue ribbon flame burners) installed in the housing 10 of the apparatus 8 above the horizontal carrying run 12 of the open conveyor belt 6 for discharging flames downwardly into contact with the top of the product 4; one or more, preferably a series of, lower lateral burners 82a-82d (preferably linear blue ribbon flame burners) installed in the housing 10 beneath the earning run 12 of the conveyor 6 for discharging flames upwardly, through the open conveyor belt 6, into contact with the bottom of the product 4; and interior heat retaining covers 84 (preferably open-bottomed box type covers which also serve as product deflectors in this embodiment) installed in the housing 10 over some or all of the upper lateral burners 80. Consequently, in the roasting apparatus 8, the carrying run 12 of the open conveyor belt 6 carries the peppers or other individual items or pieces 4 beneath the upper lateral burners 80a-80e and above the lower lateral burners 82a-82d.

In accordance with the additional features of the inventive treatment system 2, the flame roasting apparatus 8 illustrated in FIG. 5 preferably further comprises: (a) a first lateral air knife 14a positioned beneath the carrying run 12 of the conveyor 6 which follows the first upper and lower burners 80a and 82a of the apparatus 8 in terms of the direction of travel 86 of the conveyor 6 and precedes the second upper and lower burners 80b and 82b; (b) a series of two lateral air knives 14b and 14c positioned beneath the carrying run 12 of the conveyor 6 which follow the second upper and lower burners 80b and 82b and precede the third upper burner 82c; and (c) a fourth lateral air knife 14d installed below the carrying ran 12 of the conveyor 6 which is positioned directly below the fourth upper burner 80d and precedes the final upper and lower burners 80e and 82d.

In accordance with the preferred steps of the inventive treatment method, the flame roasting apparatus 8 shown in FIG. 5 can be used, for example, to flame roast peppers or other individual product items of pieces 4 by first adjusting and setting the air flow rates, air flow velocities, heights, and/or discharge angles of the various air flow knives 14a-14d so that (a) the air knife 14a will cause the product items or pieces 4 to roll or rotate by at least 20° in at least one direction, (b) the series of two air knives 14b and 14c will together cause the product items or pieces 4 to roll or rotate by at least 20° in at least one direction or cause the product 4 to roll or rotated in reverse or different directions, (c) the air knife 14d will lift the product items or pieces 4 upwardly at least 1 mm off of the conveyor 6. As one alternative, the four air knives 14a-14d together can cause the peppers or other product items or pieces 4 to roll or rotate by a total cumulative amount of at least 45° in at least one direction on the open conveyor belt 6. As another alternative, the four air knives 14a-14d can roll or rotate the product items or pieces 4 in two, three, or four different directions. As yet another alternative, some or all of the air knives 14-a-14d can roll or rotate the product items or pieces 4 back and forth in opposite directions.

After the air knives 14a-14d have been appropriately adjusted and set to change the positional orientations of the product items or pieces 4 in the manner desired, the peppers or other individual product items or pieces 4 are then continuously conveyed through the flame roasting apparatus 8 on the carrying run 12 of the open conveyor 6 such that: (1) the product is contacted by the flames discharged from the first upper and lower lateral burners 80a and 82a; (2) the positional orientation of the product items or pieces 4 is then changed by the upward air flow from the first air knife 14a; (3) the product 4 is then contacted by the flames discharged from the second upper and lower lateral burners 80b and 82b; (4) the positional orientation of the product items or pieces 4 is then changed again by the upward air flow from the second and third air knives 14b and 14c; (5) the product 4 is then contacted by the flames discharged from the third upper and lower lateral burners 80c and 82c; and (6) the product items or pieces 4 are then contacted with the flame discharged by the upper lateral burner 80d while the product items or pieces 4 are momentarily suspended at least 1 mm above the carrying run 12 of the open conveyor 6 by the fourth air knife 14d. The product 4 is then contacted by the flames discharged from the upper and lower lateral burners 89e and 82d.

Thus, the present invention is well adapted to carry out the objectives and attain the ends and advantages mentioned above as well as those inherent therein. While presently preferred embodiments and steps have been described for purposes of this disclosure, the invention is not limited in its application to the details of the preferred embodiments and steps. Numerous changes and modifications will be apparent to those in the art. Such changes and modifications are encompassed within this invention as defined by the claims. In addition, unless expressly stated, the phraseology and terminology employed herein are for purposes of description and not limitation.

What is claimed is:

1. A method of treating individual food product items or individual food product pieces comprising the steps of:
   a) continuously carrying the individual food product items or individual food product pieces through a first portion of a stationary, non-rotating housing of a treating apparatus on a carrying run of an open conveyor belt wherein, as the individual food product items or individual food product pieces are carried through the first portion of the housing, each of the individual food product items or individual food product pieces rests in a first stationary positional orientation on and in contact with the carrying run of the open conveyor belt;
   b) contacting the individual food product items or individual food product pieces with a flame positioned in the first portion of the housing as the individual food product items or individual good product pieces are carried by the carrying run of the open conveyor belt through the first portion of the housing in the first stationary positional orientation in step (a);
   c) continuously carrying the individual food product items or individual food product pieces over an air knife or a grouping of a plurality of air knives positioned in the housing beneath the carrying run of the open conveyor belt tbllowing the first portion of the housing;
   d) discharging air from the air knife or grouping of air knives through the carrying run of the open conveyor belt such that the air discharged from the air knife or grouping of air knives blows against and momentarily rolls, rotates, and/or lifts the individual food product items or individual food product pieces to place each of the individual food product items or individual food product pieces in a second stationary positional orientation on and in contact with the carrying run of the open conveyor belt, the second stationary positional orientation being different from the first stationary positional orientation;
   e) continuously carrying the individual food product items or individual food product pieces through a second portion of the housing of the treating apparatus, following the air knife or grouping of air knives, on the carrying run of the open conveyor belt wherein, as the individual food product items or individual food product pieces are carried through the second portion of the housing, each of the individual food product items or individual food product pieces rests in the second stationary positional orientation on and in contact with the carrying run of the open conveyor belt; and
   f) contacting the individual food product items or individual food product pieces with a flame positioned in the second portion of the housing as the individual food product items or individual food product pieces are carried by the carrying run of the open conveyor belt through the second portion of the housing in the second stationary positional orientation in step (e).

2. The method of claim 1 wherein the air discharged from the air knife or grouping of air knives in step (d) momentarily lifts the individual food product items or individual food product pieces upwardly at least 1 mm off of the carrying run of the open conveyor belt.

3. The method of claim 2 further comprising the step of setting an amount or velocity of the air discharged from the air knife or grouping of air knives and/or setting a height of the air knife or grouping of air knives beneath the carrying run of the open conveyor belt to momentarily lift the individual food product items or individual food product pieces upwardly at least 1 mm off of the carrying run of the open conveyor belt in step (d).

4. The method of claim 2 wherein the carrying run of the open conveyor belt runs horizontally through the housing of the treating apparatus.

5. The method of claim 1 wherein:
   the air discharged by the air knife or grouping of air knives in step (d) momentarily suspends the individual food product items or individual food product pieces at least 1 mm above the carrying run of the open conveyor belt and
   the method further comprises contacting the individual food product items or individual food product pieces with a flame while the individual food product items or individual food product pieces are momentarily suspended at least 1 mm above the carrying run of the open conveyor belt by the air discharged by the air knife or grouping of air knives in step (d).

6. The method of claim 1 wherein the air discharged from the air knife or grouping of air knives rolls and/or rotates the individual food product items or individual food product pieces in step (d) by at least 200 in at least one direction on the carrying run of the open conveyor belt from the first stationary positional orientation to the second stationary positional orientation.

7. The method of claim 1 wherein the air knife or at least one air knife of the grouping of air knives is oriented to discharge air forwardly in a direction of travel of the carrying run of the open conveyor belt which is in a range of from 5° to 45° from vertical.

8. The method of claim 1 further comprising the step of setting an amount or velocity of the air discharged from the air knife or one or more air knives of the grouping of air knives and/or setting a height of the air knife or one or more air knives of the grouping of air knives beneath the carrying run of the open conveyor belt to roll or rotate the individual food product items or individual food product pieces in step (d) at least 100 in at least one direction on the carrying run of the open conveyor belt from the first stationary positional orientation to the second stationary positional orientation.

9. The method of claim 1 further comprising the step of setting an angle of discharge of the air knife or one or more air knives of the grouping of air knives beneath the carrying run of the open conveyor belt to discharge air forwardly in a direction of travel of the carrying run of the open conveyor which is in a range of from 50 to 45° from vertical to cause the individual food product items or individual food product pieces to roll or rotate in step (d) by at least 20° in at least one direction on the carrying run of the open conveyor belt from the first stationary positional orientation to the second stationary positional orientation.

10. The method of claim 1 wherein the air discharged from the air knife or at least one of the air knives of the grouping of air knives in step (d) flips the individual food product items or individual food product pieces over on the carrying run of the open conveyor belt.

11. The method of claim 10 further comprising the step of setting an amount or velocity of the air discharged from the air knife or at least one air knife of the grouping of air knives and/or setting a height of the air knife or at least one air knife of the grouping of air knives beneath the carrying run of the open conveyor belt to flip the individual food product items or individual food product pieces over on the carrying run of the open conveyor belt.

12. The method of claim 1 wherein the air knife or grouping of air knives is a first air knife or grouping of air knives and the method further comprises the steps of:

continuously carrying the individual food product items or individual food product pieces over a second air knife or grouping of a plurality of air knives positioned in the housing beneath the carrying run of the open conveyor belt following the second portion of the housing;

discharging air intermittently from the second air knife or grouping of air knives through the carrying run of the open conveyor belt such that the air discharged from the second air knife or grouping of air knives blows against and momentarily rolls, rotates, and/or lifts a first portion of the individual ftod product items or individual food product pieces to place each one of the first portion of the individual food product items or individual food product pieces in a third stationary positional orientation on and in contact with the carrying run of the open conveyor belt but a second portion of the individual food product items or individual food product pieces remain in the second stationary positional orientation, the third stationary positional orientation being different from the second stationary positional orientation; and continuously carrying the individual food product items or individual food product pieces through a third portion of the housing of the treating apparatus, following the second air knife or grouping of air knives, on the carrying run of the open conveyor belt.

13. The method of claim 1 wherein the carrying run of the open conveyor belt carries the individual food product items or individual food product pieces upwardly or downwardly in a spiral path in the treating apparatus.

14. The method of claim 1 wherein the air knife or each air knife of the grouping of air knives comprises a tube structure which discharges a narrow air stream upwardly through the carrying run of the open conveyor belt.

15. The method of claim 14 wherein the tube structure comprises a single slit or a series of slits or nozzles from which the narrow air stream is discharged.

16. The method of claim 14 wherein the narrow air stream extends beneath at least 75% of a lateral width of the carrying run of the open conveyor belt.

\* \* \* \* \*